(12) United States Patent
Chew

(10) Patent No.: US 8,706,758 B2
(45) Date of Patent: Apr. 22, 2014

(54) FLEXIBLE ACCOUNT RECONCILIATION

(75) Inventor: Peter A. Chew, Albuquerque, NM (US)

(73) Assignee: Galisteo Consulting Group, Inc., Albuquerque, NM (US)

( * ) Notice: Subject to any disclaimer, the term of this patent is extended or adjusted under 35 U.S.C. 154(b) by 44 days.

(21) Appl. No.: 13/385,494

(22) Filed: Feb. 20, 2012

(65) Prior Publication Data

US 2013/0085910 A1 Apr. 4, 2013

Related U.S. Application Data

(63) Continuation-in-part of application No. 13/200,880, filed on Oct. 4, 2011.

(51) Int. Cl.
G06F 17/30 (2006.01)
(52) U.S. Cl.
CPC .............................. G06F 17/30578 (2013.01)
USPC ............. 707/776; 705/30; 707/706; 707/780
(58) Field of Classification Search
CPC .................................................. G06F 17/30864
USPC ..................................... 705/30; 707/1, 6, 748
See application file for complete search history.

(56) References Cited

U.S. PATENT DOCUMENTS

| | | | |
|---|---|---|---|
| 7,895,094 B2 | 2/2011 | Tandon | |
| 7,970,668 B2 | 6/2011 | Ahluwalia | |
| 8,019,739 B2 | 9/2011 | Adelson | |
| 2003/0195836 A1* | 10/2003 | Hayes et al. | 705/37 |
| 2004/0230577 A1* | 11/2004 | Kawatani | 707/6 |
| 2005/0273452 A1* | 12/2005 | Molloy et al. | 707/1 |
| 2008/0103949 A1* | 5/2008 | Lobana et al. | 705/35 |
| 2008/0208820 A1* | 8/2008 | Usey et al. | 707/3 |
| 2009/0076866 A1* | 3/2009 | Zoldi et al. | 705/7 |
| 2009/0157689 A1* | 6/2009 | Hotz | 707/10 |
| 2009/0234869 A1* | 9/2009 | Azvine et al. | 707/101 |
| 2010/0185685 A1* | 7/2010 | Chew et al. | 707/803 |
| 2010/0317007 A1* | 12/2010 | Palsson et al. | 435/6 |
| 2012/0330971 A1* | 12/2012 | Thomas et al. | 707/748 |

OTHER PUBLICATIONS

U.S. Appl. No. 13/200,880, Chew.
Chew, Bader, Helmreich, Abdelali, Verzi. 2011. An information-theoretic, vector-space-model approach to cross-language information retrieval. JNLE 17(1):37-70, Jan. 2011.
Chew and Bader. 2010. Algebraic techniques for multilingual document clustering. In Berry and Kogan (eds.), 2010. Text Mining: Applications and Theory. Chichester, UK: Wiley.

(Continued)

Primary Examiner — F. Zeender
Assistant Examiner — Hunter Wilder

(57) ABSTRACT

Disclosed are improvements to a method for account reconciliation comprising improved, extended, and more flexible algorithms for (1) automatically determining what transaction features are best candidates for matching diverse datasets; (2) automatically determining how logically to subdivide accounting datasets prior to reconciliation; (3) matching groups of transactions (allowing one-to-many, many-to-one, and many-to-many matches instead of just one-to-one matches); (4) making use of more types of transaction feature, including transaction dates (where proximity of two transactions in date may be significant even if the dates do not exactly match). The improved method is, therefore, better able to perform its intended function of identifying matching transactions. It is applicable to a wider class of problems while still saving significant costs and labor, and still retaining flexibility in not requiring source data in a particular format, and not being domain-dependent or requiring extensive user setup.

12 Claims, 4 Drawing Sheets

(56) References Cited

OTHER PUBLICATIONS

Wilson and Chew. 2010. Term weighting schemes for Latent Dirichlet Allocation. In Proceedings of NAACL-HLT 2010, 465-473.

Chew and Bader. 2009. Using DEDICOM for completely unsupervised partof-speech tagging. Proc. NAACL-HLT 2009 workshop on UMSLLS, 54-62.

Chew. 2009. Multilingual text mining. In Wang (ed.), 2009. Encyclopedia of Data Warehousing and Mining, 2nd Edition, 1380-1385.

Chew, Bader, Abdelali. 2008. Latent morpho-semantic analysis: multilingual information retrieval with character n-grams and mutual information. Proc. COLING 2008, 129-136.

Bader and Chew. 2008. Enhancing multilingual Latent Semantic Analysis with term alignment Information. In Proceedings COLING. 2008, 49-56.

Chew and Abdelali. 2008. The effects of language relatedness on multilingual information retrieval: a case study with Indo-European and Semitic languages. Proc. CLIA,1-9.

Chew. 2000. A computational phonology of Russian. D.Phil. dissertation, University of Oxford.

* cited by examiner

FIG. 2

| account | transaction date | description | $ | ID |
|---|---|---|---|---|
| XY001 | 4/10/03 | Cash receipt for W. A. Mozart, 506221A | 50.00 | A1 |
| XY001 | 5/13/03 | Cash receipt for Johannes Brahms, check # 10243340, 506224X | 50.00 | A2 |
| PQ002 | 1/17/08 | Receipt re Johann S. Bach 0034X012 Thomasschule Hillerstr. 7, 04109 Leipzig | 70.00 | A3 |

| account number | date | description | $ | ID |
|---|---|---|---|---|
| XY001 | 6/11/03 | Cash disbursement to J. Brahms | -50.00 | B1 |
| XY001 | 7/24/03 | Cash disbursement Wolfgang Mozatr 506221A | -50.00 | B2 |
| PQ002 | 2/2/09 | Payment to Emanuel Bach 0034X078 Schreberstr. 14, 04109 Leipzig | -70.00 | B3 |

| [ACCOUNT] | Sum of monetary values in: | | Top-down match possible? |
|---|---|---|---|
| | Dataset 1 | Dataset 2 | |
| XY001 | $478,800 | -$478,800 | Yes |
| XY002 | $316,250 | -$316,750 | No |
| PQ001 | $228,900 | -$228,900 | Yes |
| PQ002 | $1,440,300 | -$1,450,280 | No |

FLEXIBLE ACCOUNT RECONCILIATION

CROSS REFERENCE TO RELATED APPLICATIONS

This Application is a Continuation-in-Part (CIP) of U.S. patent application Ser. No. 13/200,880, filed Oct. 4, 2011, the contents of which are herein incorporated by reference.

BACKGROUND OF THE INVENTION

1. Field of the Invention

The present invention relates to an improved method for account reconciliation which can be used to match transactions in one accounting dataset to transactions in another accounting dataset, regardless of content, data format, or dataset size. It uses principles from information theory and data mining automatically to deduce which features relate one dataset to the other, compute empirical similarities between transactions, and use these to group transactions in a one-to-one, one-to-many, many-to-one, or many-to-many fashion, enabling a financial analyst to make sense of large datasets quickly and without time-consuming manual labor.

2. Description of the Prior Art

U.S. Pat. No. 7,895,094 describes a global account reconciliation tool provided to standardize reconciliation processes across various corporate lines of business. The reconciliation tool provides standard templates for entering transaction and account data. In this manner, open accounting items are more readily identified and reconciled. Once data is brought into these templates, the tool provides for either (1) auto-matching functionality relying on user-defined business rules, or (2) manual reconciliation.

This tool is limited to working with data which has been fitted into the templates it embodies, and any automation of the reconciliation process is not inherent to the tool, but relies on heuristics provided by the user. For the user, the process of installing and learning how to use the tool, and defining business rules could be time-consuming enough to outweigh the efficiencies of automated reconciliation. Furthermore, the accuracy of reconciliation results depends heavily on the suitability of the heuristics embodied in the user-provided business rules. This in turn makes the tool dependent on the expertise of the user in formulating heuristics.

U.S. Pat. No. 7,970,668 discloses a system and method for automated comprehensive reconciliation processing. This invention includes the maintenance of an automated checklist of the various reconciliation steps, enabling maintenance of an audit trail and generation of metrics.

This method does not automate the actual matching of transactions in one dataset to transactions in another, but instead is essentially a tracking system allowing an analyst to ensure that data is complete and that all necessary reconciliation steps are duly completed. The most time-consuming part of account reconciliation, for datasets of any reasonable size (upwards of thousands of records), is the process of actually matching data from one dataset to another. Therefore, for such datasets, this method is unlikely to achieve significant efficiency and time-saving in the area where it matters most.

U.S. Pat. No. 8,019,739 discloses a method and system for an online-like account processing and management. This method includes: reading at least one batch file containing a plurality of records, each of the plurality of records being related to an associated one of a plurality of accounts; identifying which of the plurality of records relate to same ones of the plurality of accounts; identifying one of the accounts; and, processing all of the records identified as relating to the one of the accounts together and independent of processing any of the records relating to any other of the plurality of accounts.

Again, this method does not automate the actual matching of transactions from disparate datasets, which for reconciliation problems of any significant size is highly time-consuming and labor-intensive, even if data is available real-time. Reconciliation is one step in the method but the method does not disclose how to automate this step. Therefore, for such datasets, this method is unlikely to achieve significant efficiency and time-saving specifically in reconciliation.

SUMMARY OF THE INVENTION

The present invention is a computer-implemented method for account reconciliation capable of matching transactions in one accounting dataset to transactions in another accounting dataset. It does not rely on data being provided in any specific template or format, and can be used with structured data (for example, transaction dates or transaction reference numbers provided in the fields of a database or spreadsheet) or unstructured text (for example, text data such as 'free-form' transaction descriptions, in any human language, which might also be provided in the fields of a database or spreadsheet). The invention uses principles from information theory, probability theory, natural language processing, data mining, statistics, and record linkage. Using statistical techniques, it first automatically determines which attributes in both datasets should be used as a basis to match transactions, which in effect establishes cross-dataset correlations between attributes. In some cases, this may allow large groups of transactions to be reconciled right away, if it can be seen that grouped transactions for a particular correlated pair of attributes have monetary values summing to zero. Reconciling large groups in this 'top-down' fashion makes subsequent processing significantly easier through a 'divide and conquer' strategy. The invention then uses a technique from data mining, along with an information-theoretic approach, to characterize the entire population of transactions from both datasets in a common, geometrically-defined, feature space. This then enables the transactions to be grouped into clusters, where similar transactions are positioned close to one another in the geometric space. The algorithm then looks for natural groups where the sum of the monetary values is zero (indicating a reconciling match). Since these groups may in theory contain any number of transactions, the invention allows for one-to-one, one-to-many, many-to-one, and many-to-many matches. The algorithm can be set up to run iteratively until no further matches can be found, maximizing the amount of manual labor that can be saved. In summary, the present invention can be used to automate matching that is would otherwise be done manually, saving most of the labor for large reconciliation projects.

It is therefore a primary object of the present invention to provide a flexible method for account reconciliation which will significantly streamline the process of reconciling financial accounts at a significant savings, and allowing for flexibility in matching pairs or groups.

It is another object of the present invention to provide a flexible method for account reconciliation which can easily be adapted to use with transactional data in different formats, to eliminate the necessity for a user of the invention to manipulate data into a required format before it can be reconciled, saving the user of the invention time in its use.

It is a further object of the present invention to provide a flexible method for account reconciliation where the invention automatically determines which structured-data fields in one dataset correlate with which fields in the other dataset, saving the user time and labor and eliminating some requirements for user knowledge of the content or structure of the data. This could be particularly useful for a consultant who is called in to reconcile a client's data.

It is a further object of the present invention to provide a flexible method for account reconciliation where the user of the invention is not required to develop heuristics or business rules in order for account reconciliation to be made possible, again saving the user of the invention time in its use, and eliminating requirements for user expertise.

It is still a further object of the present invention to provide a flexible method for account reconciliation which can deal with unstructured text, in cases where key information on each transaction may be included within a transaction description rather than in structured data fields; the invention does not make any presumptions about which human language or character set (e.g. English, French, Russian) is used to encode the unstructured text.

It is still a further object of the present invention to provide a flexible method for account reconciliation which produces output at least as reliable as that of a human.

It is still a further object of the present invention to provide a flexible method for account reconciliation which, after reconciling datasets, supports the generation of reports showing 'open' (unreconciled) transactions as well as matched transactions, including the groupings of matched transactions.

It is still a further object of the present invention to provide a flexible method for account reconciliation which matches transactions at as granular a level as possible (for example, matching 4 pairs of transactions separately where possible rather than matching the same transactions as a whole group of 8).

These and other objects of the present invention will become apparent to those skilled in this art upon reading the accompanying description, drawings, and claims set forth herein.

BRIEF DESCRIPTION OF THE DRAWINGS

Non-limiting and non-exhaustive embodiments of the invention are described with reference to the following figures.

FIG. 2 shows an example pair of datasets that might be used as input for the present invention.

DETAILED DESCRIPTION OF THE INVENTION

1. Definitions

Figure 1:
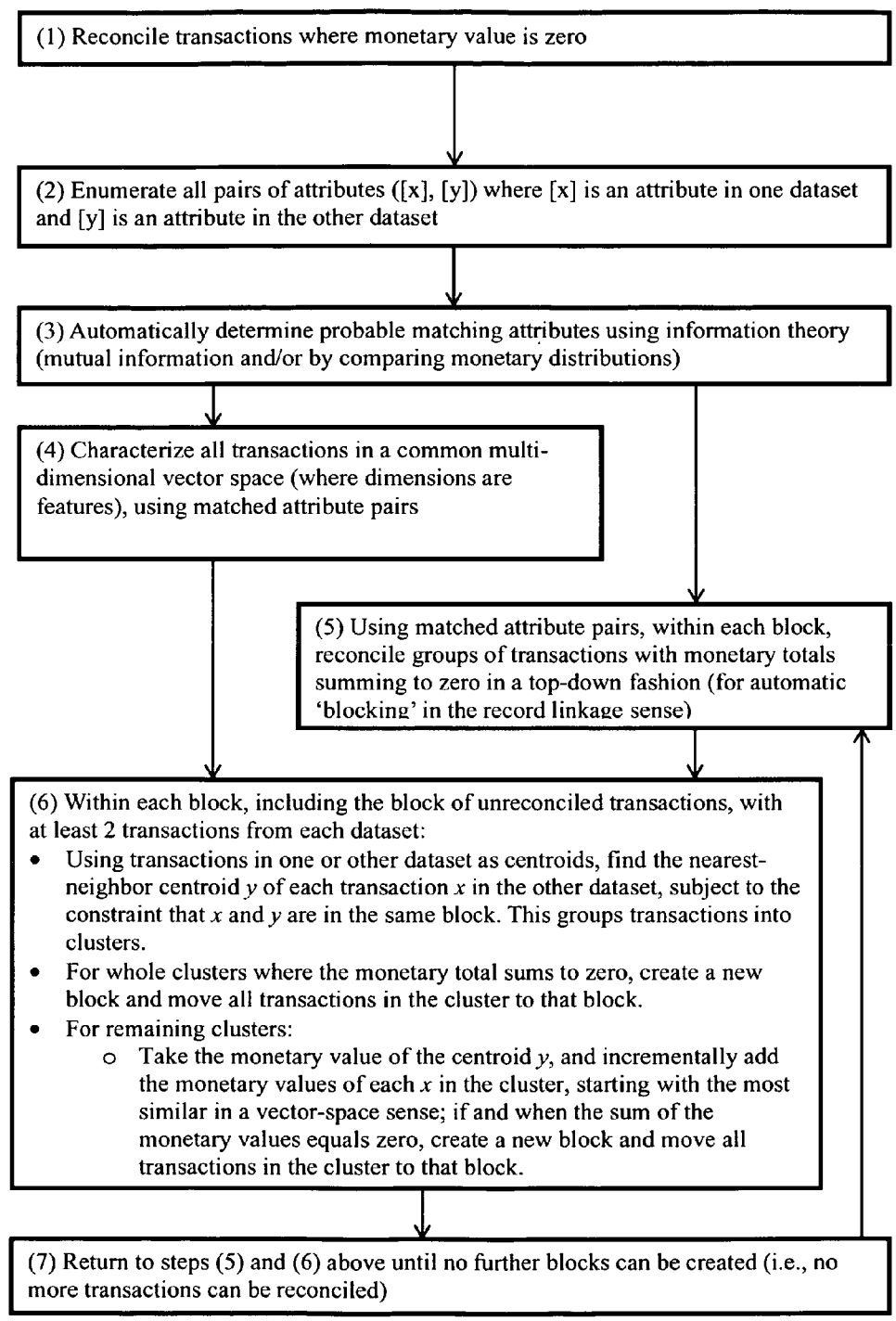
FIG. 1 shows an overview of the improved process used for account reconciliation.

Key terms used herein are defined below, and illustrated further in the Drawings.

'Dataset' as used herein shall mean a table of accounting data, for example a list of debits and credits as presented on a paper or downloaded bank statement, or data extracted from a database or accounting system. Each reconciliation problem reduces to matching transactions (rows) in a pair of datasets, i.e. exactly 2 datasets.

'Transaction' as used herein shall mean a single row in a dataset associated with a monetary value, for example a single debit or credit entry on a bank statement. For example, 6 transactions (3 per dataset) are illustrated in FIG. 2 of the Drawings.

'Attribute' as used herein shall mean a characteristic of each transaction associated with a dataset column. Attributes can be referred to by the relevant column heading in square brackets. FIG. 2 of the Drawings illustrates [account], [transaction date] and [description] attributes for the first dataset (not including the $ value and transaction unique identifier).

'Feature' as used herein shall mean a particular data value in a dataset, unassociated with any attribute. For example, '4/10/03' and 'Mozart' may be features that occur in a dataset as illustrated in FIG. 2 of the Drawings.

'Attribute-value' as used herein shall mean a pairing of an attribute and feature, i.e. a feature imbued with the semantics of the attribute it is associated with. For example, if for a particular transaction the [transaction date] is '4/10/03', then the attribute value could be denoted as {[transaction date], '4/10/03'} as illustrated in FIG. 2 of the Drawings.

'Monetary amount' and 'monetary value' as used synonymously herein shall mean a numerical value (usually expressed in currency) used as the target of reconciliation, i.e. to determine whether transactions in disparate datasets are of equal value. Examples of monetary values illustrated in FIG. 2 of the Drawings are $50.00 and $70.00. It is assumed that monetary amounts in one dataset are generally of opposite sign to monetary amounts in the other dataset, as illustrated in the two datasets in FIG. 2 of the Drawings. If data is not provided in this format, it can easily be converted to the necessary equal-and-opposite format by simply reversing the sign of all the monetary amounts in either of the two datasets.

Figures 4, 5:
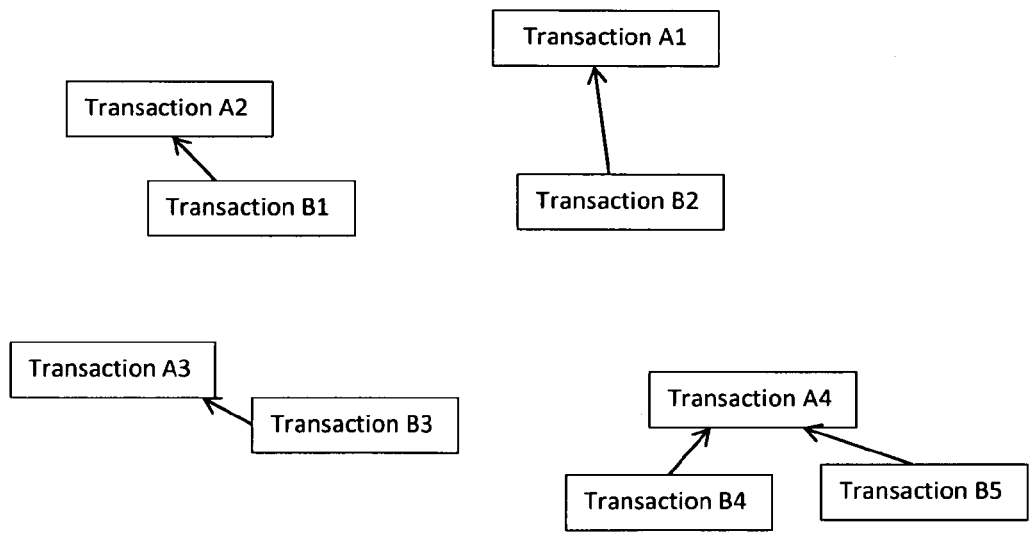
FIG. 4 shows how, once attributes are aligned under a super-attribute, monetary values may be summed and compared across datasets to determine whether in some cases top-down matching may be possible.
FIG. 5 shows a visualization of how, once transactions are represented as vectors, they can be located in geometric space, allowing similarity between transactions to be computed mathematically (e.g. using Euclidean distance, cosine, etc.) and 'nearest neighbors' to be found.

'Super-attribute' as used herein shall mean an aligned pair of attributes, one from each dataset, determined (automatically or manually) to have common meaning for reconciliation purposes. For example, one dataset might refer to [account] while the other refers to [account number]. If these in fact are two different ways of referring to the same thing, then the alignment of these two attributes creates a super-attribute which can be denoted in upper-case letters, e.g. [ACCOUNT], as illustrated in FIG. 4 of the drawings.

Figure 3:
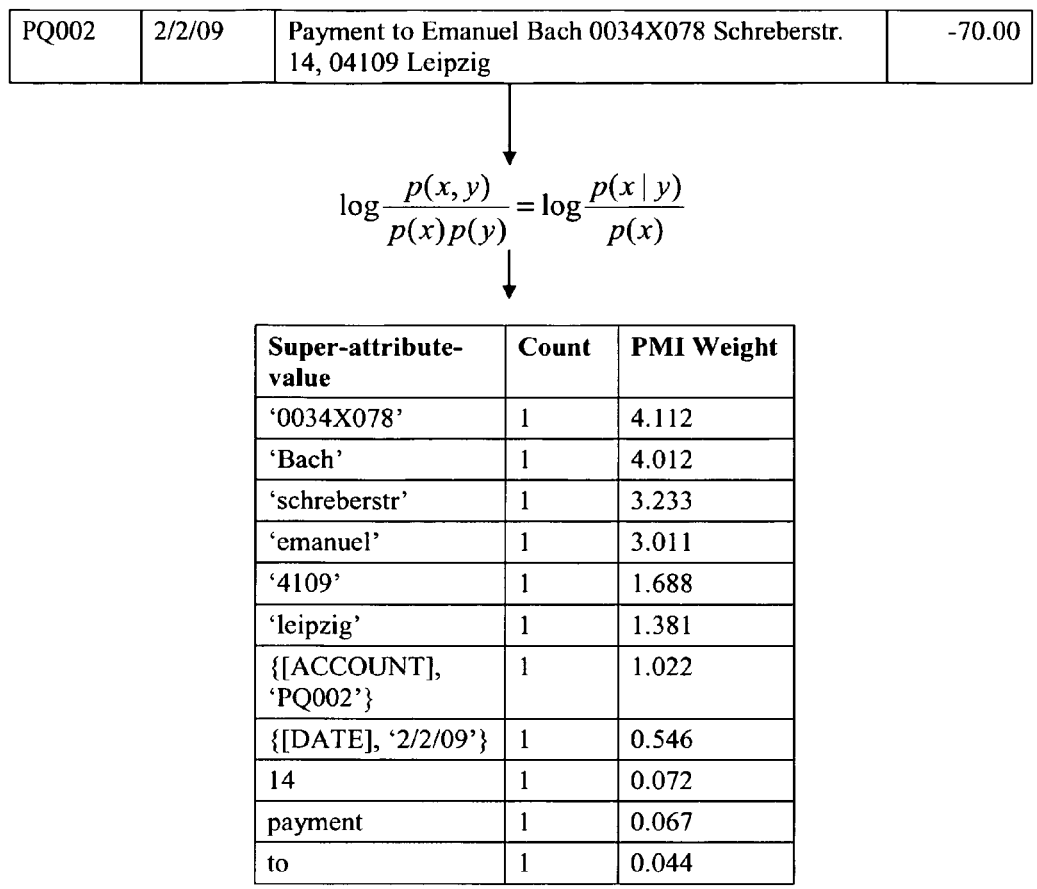
FIG. 3 shows how features of transactions, here including both words from a transaction description and super-attribute-values based on structured data attributes, may be weighted using the pointwise mutual information measure, rendering the transaction (in geometric terms) as a vector in multidimensional space.

'Super-attribute-value' as used herein shall mean a pairing of a super-attribute and feature, i.e. a feature imbued with the semantics of the super-attribute it is associated with. For example, if for a particular transaction the [DATE] super-attribute has the value '2/2/09', then the super-attribute-value could be denoted as {[DATE], '2/2/09'} as illustrated in FIG. 3 of the Drawings.

'Unstructured text attributes' as used herein shall refer to attributes where the attribute-values combine multiple terms (or words) which may individually be of use as features in reconciliation. The [description] attribute in FIG. 2 of the Drawings is an example of an unstructured text attribute, because the attribute-value of the transaction identified as A1 is 'Cash receipt for W. A. Mozart, 506221A', in which any of the individual terms (e.g. 'Mozart', '506221A') may be useful transaction features.

'Categorical attributes' as used herein shall refer to attributes where approximate matches are not tolerated for the purposes of reconciliation. For example, [account] and [account number] would be considered categorical attributes in FIG. 2 of the Drawings.

'Continuous attributes' as used herein shall refer to attributes where approximate matches are tolerated for the purposes of reconciliation. For example, [transaction date] and [date] in FIG. 2 of the Drawings could be considered continuous attributes if close proximity of two transactions in time should increase the likelihood that they should be reconciled.

2. Best Mode of the Invention

FIG. 1 shows an overview of the best mode contemplated by the inventor of the process for account reconciliation according to the concepts of the present invention.

3. How to Make the Invention

As can be amply seen from FIG. 1, the process can begin by reconciling transactions with monetary values of zero, each one in its own group. These transactions need not be considered further: as their monetary values are zero, they can have no further effect in the matching process, and would only impede that process if left unreconciled.

The next step is to enumerate all possible pairs of attributes ([x], [y]) (excluding unstructured-data attributes), where [x] is an attribute in one dataset and [y] is an attribute in the other dataset, with the goal of finding pairs which should be aligned—without aligned pairs of attributes, reconciliation is not possible.

The monetary values can be summarized by respective attribute-values, as amply illustrated in FIG. 4 of the drawings. To determine whether the attribute pair in question should be aligned, one may consider any combination of the following: (1) the proportion of monetary totals that match; (2) for categorical attributes, the mutual information between the two attributes, determined by the number of features in common between the two attributes, the number of features associated with one attribute but not the other (and vice-versa), and the number of features associated with neither attribute (the method of calculation of mutual information will be familiar to those skilled in the art); (3) whether in statistical terms the two monetary distributions differ significantly (the method of calculation of whether the distributions differ significantly can be based, for example, on comparison of Pearson's or Spearman's correlation coefficient with a table of critical values and by reference to a predetermined level of confidence, as will be appreciated by those skilled in the art); (4) for continuous attributes, whether there is a significant correlation between feature values where the total monetary amounts match (for example, if monetary totals match with a near-constant lag between [transaction date] and [date]); again, statistical significance can be calculated as outlined above in this paragraph.

For aligned attributes, groups of transactions with monetary totals summing to zero can be reconciled. This can reconcile large groups of transactions very quickly in a 'top-down' fashion. Although this step may not in itself achieve the object of maximally granular reconciliation referred to above, it nevertheless may be essential as an intermediate step for large reconciliation problems which may otherwise be computationally infeasible owing to their scale. This step achieves what is known in the field of record linkage as 'blocking' (subdividing the matching problem to make it more feasible for a human or computer, i.e. using a 'divide and conquer' strategy).

For unstructured text attributes, each constituent sub-feature, such as a word within the unstructured text (e.g. 'Mozart') can be automatically assumed to align with other instances of the same word in either of the two datasets.

For extraction of words from a transaction description (or other unstructured text), a text tokenizer is required. An example of a preferred method for text tokenization would be the regular expressions Regex.Split method used in conjunction with "\w" (the non-word character delimiter). This method can be applied to virtually any human language encoded in any Unicode script, making it particularly useful, for example, with transaction descriptions which tend to be expressed in human-readable language. If the source transactional data is in a Microsoft SQL Server 2005 or 2008 database (available from Microsoft Corporation, Redmond, Wash.), then a highly efficient way of tokenizing text fields is to implement the regular expressions method above within a Common Language Runtime database function which can then be referenced within an SQL (Structured Query Language) database query. Within other database management systems, there are likely to be equivalent methods for text tokenization. The text tokenizer converts text within transaction descriptions from the format shown in FIG. 2 to a format where each word within the text is a separate feature; the latter format is highly amenable to further data manipulation. The conversion process (inter alia) is shown in FIG. 3 of the drawings.

FIG. 3 illustrates how both the extraction of words from text and use of other aligned attributes (in this case [ACCOUNT] and [DATE]) can be accommodated within a single framework. As long as each transaction has at least one feature, there is no theoretical lower or upper limit on how many features or super-attribute-values may be included.

For aligned continuous attributes, there may be a relationship between the attribute-values in one dataset and the attribute-values in the other, and this relationship may be expressible as a distribution. For example, in reconciling receipts to related disbursements, it may be that receipts tend to be disbursed with an average delay of 7 days and a standard deviation of ±3 days. This distribution may be estimated empirically using output from the steps described in paragraph [0040] above. For best results in rendering the transactions in a common feature space, the transaction in the source dataset should be assigned all possible related attribute-values in the target dataset as a probability distribution. For example, to compare a receipt with a transaction date of Jan. 1, 2000 to disbursements, one could assign the receipt putative transaction dates of Jan. 6, 2000 with probability 0.1; Jan. 7, 2000 with probability 0.25; Jan. 8, 2000 with probability 0.3, Jan. 9, 2000 with probability 0.25; and Jan. 10, 2000 with probability 0.1. The actual probabilities assigned would depend on the empirical distribution estimated as described above. This step allows 'approximate' matching based on continuous attributes, allowing closer matches (e.g. closer dates) to be weighted more highly.

The method for account reconciliation incorporates the use of a weighting scheme to measure the distinctiveness of particular features (to include words from text or other features) in particular transactions. This can be applied either to counts (for categorical attributes) or probabilities (for continuous attributes as discussed in paragraph [0045]). A preferred weighting scheme would be based on information theory and an example would be Pointwise Mutual Information, which can be defined as the probability of feature i in (or conditional upon) transaction j, divided by the probability of feature i occurring in the entire population. In effect, this weighting scheme calculates how much more likely a feature is to occur in conjunction with a particular transaction than may be expected on the basis of chance. A formula for Pointwise Mutual Information is shown in FIG. 3, along with sample results of applying this weighting to features from tokenized text and super-attribute values. The most distinctive features (including words) for the transaction are assigned higher weightings, while features which are non-distinctive are assigned lower weightings. Use of a weighting scheme in this fashion is resilient to typographical and other encoding errors in the source data, and will automatically recognize which features are most distinguishing within a particular population, without any a priori knowledge of the characteristics of the population. This is a key reason that the present invention is highly generalizable to different datasets.

Once the transaction features are extracted and weighting is assigned, the method for account reconciliation conceives of the transactions as being associated with n-dimensional vectors in a Euclidean space, where n is the number of distinct features in the entire population. For a particular transaction, the n-dimensional vector is the list of features, each associated with the Pointwise Mutual Information value for that feature. This conception allows similarities between pairs of transactions to be calculated using a geometric measure. An example of such a geometric measure is the cosine metric used in the field of Information Retrieval, which can range between −1 and +1. A cosine of +1 indicates that the vectors for the pair of transactions are perfectly aligned with one another, a cosine of 0 indicates that the vectors are completely orthogonal to one another, and a cosine of −1 indicates that the vectors are perfectly negatively aligned. Thus, a higher cosine between a pair of transactions indicates that the pair is more similar to one another. Note that use of the cosine metric allows matches to be made between pairs based on unstructured text or continuous attributes even if the matches are not 'absolute'; in other words, this part of the process assigns each pair a measure of greater or lesser similarity, rather than saying that a pair 'is similar' or 'is not similar'. Furthermore, the cosine metric can be applied equally regardless of the underlying extracted features. The similarity measure can also be used to find natural clusters of transactions in the n-dimensional space, as illustrated in FIG. 5 of the drawings and described in paragraph [0048].

The next step is to group transactions into logical 'similar' groups. This proceeds as illustrated in FIG. 5 of the drawings. Using either dataset as a starting point, all the transactions in that dataset (e.g. A1, A2, A3 . . . ) are used as reference points ('reference transactions'). Then, for each transaction in the other dataset, the most similar one reference transaction (the 'nearest neighbor') is found, according to whatever measure of similarity is being used (e.g., cosine, Euclidean distance). This proceeds subject to the constraint that no transaction can be associated with another transaction that is in a different reconciled block.

Once all transactions have been assigned to groups in this way, entire groups where the monetary values sum to zero can be reconciled (i.e., assigned to new reconciled blocks). This step may either reconcile previously unreconciled transactions, or break previously reconciled transactions into smaller blocks, moving towards the goal of maximal granularity described above.

For any groups where the monetary values do not sum to value, the algorithm can start with the reference transaction and progressively add (include) the other associated transactions, starting with the most similar, the next most similar, and so on, until such time as the monetary value of all transactions included so far sums to zero. At this point, the included transactions are reconciled (i.e., assigned to a new reconciled block). As previously, this step may either reconcile previously unreconciled transactions, or break previously reconciled transactions into smaller blocks, moving towards the goal of maximal granularity described above.

The steps described in paragraphs [0048] through [0050] can be iteratively repeated with the option of changing which dataset is used to provide reference points.

The step described in paragraph [0041] can also be iteratively repeated (after the steps described in paragraphs [0048] through [0051]) since the latter may uncover new possibilities for top-down reconciliation which were not previously apparent.

All steps which may be iteratively repeated can be repeated until no further automated reconciliation is possible, maximizing the savings of labor and effort required by a human.

Once decisions have been made on which transactions to reconcile, the method supports the reporting of matched pairs/groups and unmatched transactions. One means of accomplishing this is to store all data in database tables which include additional fields to encode which transactions are reconciled to which other transactions. Unreconciled transactions can be denoted by leaving these fields blank. For those skilled in the art, it is then clear that reports of reconciled and unreconciled transactions can easily be generated and rendered to a display by designing queries as needed, for example using Structured Query Language.

The processes explained above may constitute computer-executable instructions (e.g. software, firmware) embodied or stored within a machine-readable storage medium, that when executed by a machine will cause the machine (e.g. computer, processor, etc.) to perform the operations described. Additionally, the processes may be embodied within hardware, such as an application specific integrated circuit ("ASIC") or the like.

A machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g. read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

4. How to Use the Invention

The method for account reconciliation is designed to be 'unsupervised', meaning that very little user intervention is necessary. This in turn leads to a significant savings in labor compared to existing methods. If the method is implemented as computer-executable instructions embodied or stored within a machine-readable storage medium, the user need simply specify (e.g. through a user interface) which two datasets are to be used as input, and the machine will output results indicating which transactions in one dataset are reconciled to which transactions in the other dataset.

The problems addressed by the method for account reconciliation are many as can be easily seen by those skilled in the art. The method for account reconciliation is not restricted to working with data in a particular format or even text in a particular human language. It is not limited in terms of the number or type of features that transactions may have. It is not limited by size of dataset, and in fact is anticipated to provide increasingly greater efficiencies and savings with larger datasets. It avoids the need for specifying heuristics particular to individual datasets. Through the connections with statistics and information theory, it can be relied upon to produce results which may even exceed the accuracy of a human, since the algorithm is able to gain a 'global' picture of similarities between transactions that a human could not achieve for large datasets. The present invention can dramatically reduce the amount of labor, and therefore the costs, associated with account reconciliation, particularly on a large scale. Since account reconciliation is a function performed by virtually every accounting department of every organization, the present invention has widespread uses.

Thus it will be appreciated by those skilled in the art that the present invention is not restricted to the particular preferred embodiments described with reference to the drawings, and that variations may be made therein without departing from the scope of the present invention as defined in the appended claims and equivalents thereof.

What is claimed is:

1. A computer implemented method of reconciling financial transactions on a computer having at least a first dataset and a second dataset, comprising the steps of:
    aligning attributes of a first plurality of transactions having monetary values using a statistical technique to automatically enumerate pairs of attributes in which one member of the pair is a first attribute from the first dataset and the other member of the pair is a second attribute from the second dataset, and wherein aligning attributes of the first plurality of transactions further comprises identifying which of the enumerated pairs are super-attributes;
    performing top-down reconciling, wherein performing top-down reconciling comprises:
        combining the first plurality of transactions from the first and second datasets into a single list which incorporates the super-attributes,
        grouping the single list of transactions by super-attributes,
        summing the monetary values of the transactions in each group, and
        reconciling each group of transactions where the summed monetary value is zero to a first set of uniquely identified reconciled groups;
    performing further reconciling using an information theory technique on a second plurality of transactions where the summed monetary value for each group of transactions taken from the first plurality of transactions was not zero, wherein performing further reconciling comprises:
        rendering the second plurality of transactions in a common Euclidean space defined by features of aligned attributes,
        identifying a first reference transaction within the second plurality of transactions in the first or second dataset,
        using a clustering algorithm to identify clusters of similar transactions in either the first or second dataset that are most similar to the first reference transaction,
        summing the monetary values of each cluster,
        reconciling the clusters of similar transactions with the first reference transaction where the summed monetary value is zero to a second set of uniquely identified reconciled groups,
        creating an ordered list of a third plurality of transactions where the summed monetary value for each cluster of similar transactions taken from the second plurality of transactions was not zero, wherein the ordered list is in a descending order of similarity between a second reference transaction and each transaction in the ordered list,
        setting a variable n equal to the monetary value of the second reference transaction,
        progressively adding to n the monetary values of the third plurality of transactions in the ordered list, in the descending order of similarity, until n=zero or until there are no further transactions in the ordered list, wherein if n=zero then reconciling the second reference transaction and the third plurality of transactions from the ordered list whose monetary values were added to n to a third set of uniquely identified reconciled groups, and
        iteratively repeating the performing of further reconciling for a fourth plurality of transactions taken from the third plurality of transactions which were not reconciled into the first, second or third set of uniquely reconciled groups, until no further reconciled groups can be found; and
    iteratively repeating the performing of top-down reconciling and the performing of further reconciling for a fifth plurality of transactions taken from the first plurality of transactions which were not reconciled or iteratively reconciled into the first, second or third set of uniquely reconciled groups or until no further reconciled groups can be found;
    wherein performing the aligning, top-down reconciling and further reconciling steps do not depend on dataset-specific heuristics requiring any human input beyond specifying the first and second datasets to be reconciled; and
    wherein the aligning, top-down reconciling and further reconciling are performed by the computer.

2. The method according to claim 1, further comprising assigning each of the first plurality of transactions where the respective monetary values are zero to a fourth set of uniquely identified reconciled groups prior to aligning attributes.

3. The method of claim 1, wherein aligning attributes of transactions further comprises:
    grouping transactions from the first dataset by distinct features of the first attribute,
    grouping transactions from the second dataset by distinct features of the second attribute,
    aggregating monetary values by group for the first dataset to arrive at a first monetary distribution,
    aggregating monetary values by group for the second dataset to arrive at a second monetary distribution,
    calculating a statistical correlation between the first and second monetary distributions, and
    associating the first and second attributes with a super-attribute if and only if the statistical correlation for the first and second attributes exceed critical value at a user-specified confidence level, wherein the user-specified confidence level adds a small degree of human input.

4. The method of claim 1, wherein aligning attributes of transactions further comprises:
    grouping transactions from the first dataset by distinct features of the first attribute and aggregating monetary values by group to arrive at a first list of features and aggregate monetary values;
    grouping transactions from the second dataset by distinct features of the second attribute and aggregating monetary values by group to arrive at a second list of features and aggregate monetary values;

joining the first and second lists on aggregate values to associate features from the first list with features from the second list in a third joined list, providing that only aggregate values which are unique within the first and second lists are included;

calculating a statistical correlation between the features of the joined first and second lists; and associating the first and second attributes with a super-attribute if and only if the calculated statistical correlation for the first and second attributes exceeds a critical value at a user-specified confidence level, wherein the user-specified confidence level adds a small degree of human input.

5. The method according to claim 1, further comprising extracting features from the first plurality of transactions containing unstructured or structured text, wherein the features may be extracted from transactions containing unstructured text using text tokenization, wherein the text can be in any human language.

6. The method of claim 5, wherein text tokenization further comprises a regular-expressions Regex.Split method used in conjunction with a non-word character delimiter "\w".

7. The method of claim 1, wherein the method further comprises:

performing further additional reconciling using the information theory technique on the first plurality of transactions, wherein performing further additional reconciling comprises:

rendering the first plurality of transactions in a common Euclidean space defined by features of aligned attributes, identifying a third reference transaction within the first plurality of transactions in the first or second dataset and in a first reconciled group from the first set of uniquely identified reconciled groups, using a clustering algorithm to identify clusters of similar transactions in either the first or second dataset and in the first reconciled group that are most similar to the third reference transaction, summing the monetary values of each cluster, reconciling the clusters of similar transactions with the third reference transaction where the summed monetary value is zero to a fourth set of uniquely identified reconciled groups, creating an ordered list of a sixth plurality of transactions where the summed monetary value for each cluster of similar transactions taken from the first plurality of transactions was not zero, wherein the ordered list is in a descending order of similarity between a fourth reference transaction and each transaction in the ordered list, setting a variable n equal to the monetary value of the fourth reference transaction, and progressively adding to n the monetary values of the sixth plurality of transactions in the ordered list, in the descending order of similarity, until n=zero or until there are no further transactions in the ordered list, wherein if n=zero then reconciling the fourth reference transaction and the fifth plurality of transactions from the ordered list whose monetary values were added to n to a fifth set of uniquely identified reconciled groups; and iteratively repeating the performing of further additional reconciling for a seventh plurality of transactions taken from the first plurality of transactions which were not reconciled into the fourth or fifth set of uniquely reconciled groups or until no further reconciled groups can be found.

8. The method of claim 1, wherein the clustering algorithm further comprises:

constructing an n-dimensional Euclidean vector for each transaction, where n is a number of distinct features of all transactions;

populating the vector with numerical values corresponding to weighted values specific to the transactions and features, and zero where transactions and features do not co-occur; and calculating cosines between pairs of vectors to measure the similarity between the respective pairs of transactions.

9. The method of claim 8, wherein the weighted values are calculated according to said method includes a Pointwise Mutual Information weighting function according to the following relation:

$$w(i,j)=\log(p(i|j))-\log(p(i)),$$

where i represents an attribute-value variable, j represents a transaction variable, $w(i,j)$ represents a weighted value of attribute-value i in transaction j, $p(i|j)$ represents the probability of selecting attribute-value i conditional upon transaction j, and $p(i)$ represents the probability of selecting attribute-value i in the entire population, and where $w(l,j)$ is zero if attribute-value i is not associated with transaction j.

10. The method of claim 1, wherein aligning attributes further comprises:

grouping transactions from the first dataset by distinct features of the first attribute and aggregating monetary values by group to arrive at a first list of features and aggregate monetary values;

grouping transactions from the second dataset by distinct features of the second attribute and aggregating monetary values by group to arrive at a second list of features and aggregate monetary values;

joining the first and second lists on aggregate values to associate features from the first list with features from the second list in a third joined list, providing that only aggregate values which are unique within the first and second lists are included;

calculating a statistical correlation between the features of the first and second lists;

associating the first and second attributes with a super-attribute if and only if the calculated statistical correlation for the pair of attributes exceeds a critical value at a user-specified confidence level, wherein the user-specified confidence level adds a small degree of human input;

if the first and second attributes are associated with the super-attribute, using the third joined list to compile a probability distribution relating putative features to actual features;

replacing actual features of transactions with putative features; and weighting the putative features according to probabilities in the probability distribution.

11. A non-transitory computer readable medium maintaining instructions for reconciling financial transactions executable by a processor having at least a first dataset and a second dataset, the instructions including operations comprising:

aligning attributes of a first plurality of transactions having monetary values using a statistical technique to automatically enumerate pairs of attributes in which one member of the pair is a first attribute from the first dataset and the other member of the pair is a second attribute from the second dataset, and wherein aligning attributes of the first plurality of transactions further comprises identifying which of the enumerated pairs are super-attributes;

performing top-down reconciling, wherein performing top-down reconciling comprises:
  combining the first plurality of transactions from the first and second datasets into a single list which incorporates the super-attributes,
  grouping the single list of transactions by super-attributes,
  summing the monetary values of the transactions in each group, and
  reconciling each group of transactions where the summed monetary value is zero to a first set of uniquely identified reconciled groups;

performing further reconciling using an information theory technique on a second plurality of transactions where the summed monetary value for each group of transactions taken from the first plurality of transactions was not zero, wherein performing further reconciling comprises:
  rendering the second plurality of transactions in a common Euclidean space defined by features of aligned attributes,
  identifying a first reference transaction within the second plurality of transactions in the first or second dataset,
  using a clustering algorithm to identify clusters of similar transactions in either the first or second dataset that are most similar to the first reference transaction,
  summing the monetary values of each cluster,
  reconciling the clusters of similar transactions with the first reference transaction where the summed monetary value is zero to a second set of uniquely identified reconciled groups,
  creating an ordered list of a third plurality of transactions where the summed monetary value for each cluster of similar transactions taken from the second plurality of transactions was not zero, wherein the ordered list is in a descending order of similarity between a second reference transaction and each transaction in the ordered list,
  setting a variable n equal to the monetary value of the second reference transaction,
  progressively adding to n the monetary values of the third plurality of transactions in the ordered list, in the descending order of similarity, until n=zero or until there are no further transactions in the ordered list, wherein if n=zero then reconciling the second reference transaction and the third plurality of transactions from the ordered list whose monetary values were added to n to a third set of uniquely identified reconciled groups, and
  iteratively repeating the performing of further reconciling for a fourth plurality of transactions taken from the third plurality of transactions which were not reconciled into the first, second or third set of uniquely reconciled groups, until no further reconciled groups can be found; and iteratively repeating the performing of top-down reconciling and the performing of further reconciling for a fifth plurality of transactions taken from the first plurality of transactions which were not reconciled or iteratively reconciled into the first, second or third set of uniquely reconciled groups or until no further reconciled groups can be found;

wherein performing the aligning, top-down reconciling and further reconciling steps do not depend on dataset-specific heuristics requiring any human input beyond specifying the first and second datasets to be reconciled.

12. A system of reconciling financial transactions, comprising:
  a computer having financial transactions in at least a first dataset and a second dataset to be reconciled and stored thereon configured to perform:
    aligning attributes of a first plurality of transactions having monetary values using a statistical technique to automatically enumerate pairs of attributes in which one member of the pair is a first attribute from the first dataset and the other member of the pair is a second attribute from the second dataset, and wherein aligning attributes of the first plurality of transactions further comprises identifying which of the enumerated pairs are super-attributes;
    performing top-down reconciling, wherein performing top-down reconciling comprises:
      combining the first plurality of transactions from the first and second datasets into a single list which incorporates the super-attributes,
      grouping the single list of transactions by super-attributes,
      summing the monetary values of the transactions in each group, and
      reconciling each group of transactions where the summed monetary value is zero to a first set of uniquely identified reconciled groups;
    performing further reconciling using an information theory technique on a second plurality of transactions where the summed monetary value for each group of transactions taken from the first plurality of transactions was not zero, wherein performing further reconciling comprises:
      rendering the second plurality of transactions in a common Euclidean space defined by features of aligned attributes,
      identifying a first reference transaction within the second plurality of transactions in the first or second dataset,
      using a clustering algorithm to identify clusters of similar transactions in either the first or second dataset that are most similar to the first reference transaction,
      summing the monetary values of each cluster,
      reconciling the clusters of similar transactions with the first reference transaction where the summed monetary value is zero to a second set of uniquely identified reconciled groups,
      creating an ordered list of a third plurality of transactions where the summed monetary value for each cluster of similar transactions taken from the second plurality of transactions was not zero, wherein the ordered list is in a descending order of similarity between a second reference transaction and each transaction in the ordered list,
      setting a variable n equal to the monetary value of the second reference transaction,
      progressively adding to n the monetary values of the third plurality of transactions in the ordered list, in the descending order of similarity, until n=zero or until there are no further transactions in the ordered list, wherein if n=zero then reconciling the second reference transaction and the third plurality of transactions from the ordered list whose monetary values were added to n to a third set of uniquely identified reconciled groups, and iteratively repeating the performing of further reconciling for a fourth plurality of transactions taken from the third plurality of transactions which were not reconciled into the first, second or third set of uniquely reconciled groups, until no further reconciled groups can be found; and iteratively repeating the performing of top-down reconciling and the performing of further reconciling for a fifth plurality of transactions taken from the first plurality of transactions which were not reconciled or iteratively reconciled into the first, second or third set of uniquely reconciled groups or until no further reconciled groups can be found; and the computer configured to perform the aligning, top-down reconciling and further reconciling steps without depending on dataset-specific heuristics requiring any human input beyond specifying the first and second datasets to be reconciled.

\* \* \* \* \*